United States Patent
Hirano et al.

(10) Patent No.: US 6,221,961 B1
(45) Date of Patent: Apr. 24, 2001

(54) MOLDING RESIN COMPOSITION

(75) Inventors: Hideki Hirano; Ryosuke Kaneshige; Masahide Tanaka, all of Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/242,492

(22) PCT Filed: Jun. 16, 1998

(86) PCT No.: PCT/JP98/02632

§ 371 Date: Feb. 19, 1999

§ 102(e) Date: Feb. 19, 1999

(87) PCT Pub. No.: WO98/58024

PCT Pub. Date: Dec. 23, 1998

(30) Foreign Application Priority Data

Jun. 19, 1997 (JP) .................................................... 9-162395
Jun. 24, 1997 (JP) .................................................... 9-167747
Dec. 12, 1997 (JP) .................................................... 9-342782

(51) Int. Cl.$^7$ ............................ C08L 51/00; C08L 55/02; C08L 59/00; C08L 77/00
(52) U.S. Cl. ............................ 525/65; 523/407; 525/66; 525/531
(58) Field of Search ............................ 525/65, 531, 66; 523/407

(56) References Cited

U.S. PATENT DOCUMENTS

| 4,341,682 | * | 7/1982 | Tobias | 525/531 X |
| 4,444,923 | * | 4/1984 | McCarty | 523/407 X |
| 4,735,992 | * | 4/1988 | Nogues | 525/65 X |
| 4,812,513 | | 3/1989 | Hirose | 525/65 |
| 4,943,658 | | 7/1990 | Kinoshita et al. | 562/572.2 |
| 4,997,720 | * | 3/1991 | Bourbonais et al. | 525/65 X |
| 5,068,260 | * | 11/1991 | Noguchi | 525/65 X |
| 5,276,097 | * | 1/1994 | Hoffmann et al. | 525/531 X |
| 5,475,053 | * | 12/1995 | Niessner et al. | 525/66 X |
| 5,574,079 | * | 11/1996 | Eaton et al. | 525/531 X |
| 5,686,532 | * | 11/1997 | Bederke et al. | 525/407 X |
| 5,728,767 | * | 3/1998 | Kanetou et al. | 523/407 X |
| 6,075,091 | * | 6/2000 | Tanaka et al. | 525/66 |

FOREIGN PATENT DOCUMENTS

| 1089973 | 7/1994 | (CH) . |
| 5-36966 A2 | 4/1993 | (EP) . |
| 52-77155 | 6/1977 | (JP) . |
| 2-6506 | 1/1990 | (JP) . |
| 2-178346 | 7/1990 | (JP) . |
| 2-242849 | 9/1990 | (JP) . |
| 3-143907 | 6/1991 | (JP) . |
| 4-239566 | 8/1992 | (JP) . |
| 5-271355 | 10/1993 | (JP) . |
| 6-49320 | 2/1994 | (JP) . |
| 6-145500 | 5/1994 | (JP) . |
| 8-239414 | 9/1996 | (JP) . |
| 87 7900A2 | 12/1987 | (WO) . |

* cited by examiner

Primary Examiner—Richard D. Lovering
(74) Attorney, Agent, or Firm—Birch, Stewart, Kolasch & Birch, LLP

(57) ABSTRACT

A composition prepared by adding as the sliding properties improving agent a small amount of ethylene-α-olefin random copolymer having polar groups to engineering plastics including polyacetal, ABS, and polyamide is suitable for the manufacture of gears, rotary shafts and bearings by way of exploiting its molding processability including excellent mold release properties, and at the same time is capable of enhancing its friction/wear resistance. As the sliding properties improving agent, an oxidation-modified material produced from ethylene-α-olefin random copolymer or a graft-modified material prepared by graft-copolymerizing an ethylenic unsaturated monomer having carboxylic acid group, hydroxyl group or the like with ethylene-α-olefin random copolymer is particularly preferable.

17 Claims, No Drawings

MOLDING RESIN COMPOSITION

This application is the national phase under 35 U.S.C. §371 of prior PCT International Application No. PCT/JP98/02632 which has an International filing date of Jun. 16, 1998 which designated the United States of America.

TECHNICAL FIELD

The present invention relates to a molding resin composition, or more particularly, a molding resin composition suitable for the manufacture of molded articles having sliding properties and friction/wear resistance.

BACKGROUND ART

So-called engineering plastics, such as polyacetal resin, ABS resin, polyamide resin, polyphenylene oxide resin, polyimide resin, thermoplastic polyester resin, polycarbonate resin, epoxy resin, thermosetting unsaturated polyester resin, phenolic resin and the like are extensively used in various industrial fields like the automotive industry and the electronic-electric industries on account of their high melting points or softening points as well as excellent mechanical properties.

Nevertheless, what are required for any resin used for parts having sliding surfaces like gears used in precision machines are a low coefficient of friction, that is, excellent sliding properties, and excellent friction/wear resistance, and in this respect, the aforementioned engineering plastics by themselves cannot be said to inherently possess sufficient sliding properties and friction/wear resistance.

Molded articles impregnated with grease or the like, as a sliding property improving agent, which have been used up to the present give rise to such problems that grease blooms or exudes to the surface with the result that neighboring parts are stained or the sliding properties improving effect does not last long enough.

There is available another method of incorporating a polymer like fluoroplastics or olefin plastics as an additive to improve the sliding properties of the aforementioned engineering plastics. Even though sliding properties of plastics are improved by this separate method, these polymer additives are accompanied by shortcomings associated with molding processibility such that peel-off of the polymer additive occurs in consequence of the phase separation on the surface of the molded article, due to their poor compatibility with said engineering plastics. Hence the mold release properties are inferior, on the top of the fact that fluoroplastics are generally expensive.

DISCLOSURE OF THE INVENTION

It is the primary object of the present invention to provide a molding resin composition capable of improving sliding properties of molded articles by decreasing their coefficients of friction and imparting excellent friction/wear resistance.

The secondary object is to provide a molding resin composition having excellent molding processibility, such as good mold release properties and no mold fouling.

The present invention relates a molding resin composition comprising of a resin (A) and a modified ethylene-α-olefin random copolymer (B), both of which are described in detail hereunder, having the following composition. Namely, it is a molding resin composition comprising:

(A) 100 parts by weight of one kind of resin selected from the group consisting of polyacetal resin, ABS resin polyamide resin, polyphenylene oxide resin, polyimide resin, thermoplastic polyester resin, polycarbonate resin, epoxy resin, thermosetting unsaturated polyester resin and phenolic resin, and (B) 0.1–15 parts by weight of ethylene-α-olefin random copolymer having polar groups, wherein (a) the ethylene-α-olefin random copolymer comprises 20–80 mole % of ethylene units and 20–80 mole % of α-olefin units based on its total structural unit, and wherein the ethylene-α-olefin random copolymer having polar groups has (b) its number average molecular weight (Mn) is 500–10000, and (c) its molecular weight distribution (Mw/Mn) represented by the ratio of the weight average molecular weight (Mw) to the number average molecular weight (Mn) is 1.2–3.

The polar group of the ethylene-α-olefin random copolymer having polar groups is preferably of one kind selected from the group consisting of carboxyl group, carboxylic acid anhydride group, carbonyl group, oxycarbonyl group, formyl group and hydroxyl group.

It is particularly preferable that the ethylene-α-olefin random copolymer having polar groups is an oxidation-modified material (B-1) produced from ethylene-α-olefin random copolymer, above all an oxidation-modified material having an oxygen content of 0.1–20% by weight, an acid value of 0.1–50 mgKOH/g, and a saponification value of 0.1–100 mgKOH/g.

Also, it is preferable that the ethylene-α-olefin random copolymer having polar groups is a graft-modified material (B-2) produced by graft-copolymerizing 0.1–20% by weight of an ethylenic unsaturated monomer having 3–10 carbon atoms with ethylene-α-olefin random copolymer, which has at least one kind of polar group selected from the group consisting of carboxylic acid group, carboxylic acid anhydride group, ester group and hydroxyl group.

BEST MODE FOR CARRYING OUT THE INVENTION

The molding resin composition of the present invention comprises, as described in the foregoing, a specific resin (A) and a small amount of ethylene-α-olefin random copolymer having polar groups (B). The present invention is described specifically as follows.

The resin (A)

The resin (A) is either one of polyacetal resin, ABS resin, polyamide resin, polyphenylene oxide resin, polyimide resin, thermoplastic polyester resin, and polycarbonate resin which are classified as thermoplastic resins and epoxy resin, thermosetting unsaturated polyester resin and phenolic resin which are classified as thermosetting resins.

The resins are by themselves well-known resins as they are described in publications like, for example, "Engineering Plastics, edited by Hiroshi Maki and Rikio Kobayashi and published by Sangyo Tosho Co., Ltd." and "FRP Design Handbook", etc. The preferred mode of each said resin is explained as follows.

(1) Polyacetal Resin

Typically, it is the resin obtained by ring-opening polymerizing formalin or trioxane with, if so required, ethylene oxide in the presence of a cationic catalyst. It is preferable in the present invention that said resin, which has polyoxymethylene chain as its backbone chain, is of the copolymer type. This kind of polyacetal resin is commercially available by such trade names as "lupital" manufactured by Mitsubishi Engineering Plastics Co., Ltd., and "Duracon" manufactured by Polyplastics Co., Ltd. and is preferably used in the present invention.

(2) ABS Resin

Typically, it is a high-impact resin obtained by graft-polymerizing acrylonitrile and styrene, etc. with an elastomeric component such as polybutadiene. It is preferable in the present invention that its polybutadiene content is 5–40% by weight and the styrene content-to-acrylonitrile content (styrene/acrylonitrile) ratio by weight is 70/30–80/20. This kind of ABS resin is commercially available by such trade names as "Stylac" manufactured by Asahi Chemical Industry Co., Ltd., "Cycolac" manufactured by Ube-Cycon Co., Ltd., "Toyorac" manufactured by Toray Corporation, etc. and is preferably used in the present invention.

(3) Polyamide Resin

Typically, it is a resin obtained by polycondensation of diamine with dicarboxylic acid, or ring-opening polymerization of caprolactam. It is preferable in the present invention that said kind of resin is a product of polycondensation reaction of aliphatic diamine with aliphatic or aromatic dicarboxylic acid. This kind of resin is commercially available by such trade names as "Leona" manufactured by Asahi Chemical Industries Co., Ltd. and "Zytel" manufactured by DuPont Japan Limited and is preferably used in the present invention.

(4) Polyphenylene Oxide Resin

Typically, it is a resin obtained by causing oxidative coupling reaction of 2,6-dimethyl phenol in the presence of a copper catalyst. Besides this resin, a modified polyphenylene oxide resin produced by blending another resin therewith may be used in the present invention. A modified material produced by blending styrene polymer with polyphenylene oxide resin is preferably used in the present invention. This kind of polyphenylene oxide resin is commercially available by such trade names as "Xyron" manufactured by Asahi Chemical Industries Co., Ltd. and "lupiace" manufactured by Mitsubishi Engineering Plastics Co., Ltd., etc. and is preferably used in the present invention.

(5) Polyimide Resin

Typically, it is a resin obtained by producing the imide bond as an integral part of the main polymer chain by polycondensation reaction of tetracarboxylic acid with diamine. It is preferable in the present invention that said kind of resin is produced from pyromellitic anhydride and diaminodiphenyl ether. This kind of resin is commercially available by such trade names as "Vesper" manufactured by DuPont Japan Limited, etc. and is preferably used in the present invention.

(6) Thermoplastic Polyester Resin

Typically, it is a resin obtained by polycondesation of dicarboxylic acid with diol. In the present invention, polyethylene terephthalate, polybutylene terephthalate, polyethylene 2,6-naphthalene dicarboxylate, polycyclohexane terephthalate and the like are preferably used. This kind of thermoplastic polyester resin is commercially available by the trade name of "Lynite" manufactured by DuPont Japan Limited, etc. and is preferably used in the present invention.

(7) Polycarbonate Resin

Typically, it is a resin obtained by reacting aromatic diol like bisphenol-A with phosgene. In the present invention, diethylene glycol diallyl carbonate is preferable. This kind of polycarbonate resin is commercially available by such trade names as "Novarex" manufactured by Mitsubishi Chemical Co., Ltd., "Panlite" manufactured by Teijin Kasei Co., Ltd., and "Lexan" manufactured by Japan GE Plastics Co., Ltd. and is preferably used in the present invention.

The above-mentioned resins (1) through (7) are thermoplastics. The resins enumerated below as (8) through (10) are thermosetting resins and explanations are furnished as follows pertaining to those resins in the pre-cure state.

(8) Epoxy Resin

Typically, it is a resin produced by reacting aromatic diol like bisphenol-A with epichlorohydrin in the presence of an alkali. It is preferable in the present invention to use bisphenol-A type epoxy resin, bisphenol-F type epoxy resin or bisphenol-S type epoxy resin of 170–5000 epoxy equivalent. This kind of epoxy resin is commercially available by such trade names as "Epomik" manufactured by Mitsui Chemicals, Inc., "Epiclon" manufactured by Dai Nippon Ink Chemical Industry Co., Ltd. and "Sumiepoxy" manufactured by Sumitomo Chemical Industry Co., Ltd.

(9) Thermosetting Unsaturated Polyester Resin

Typically, it is a resin obtained by esterification reaction of aliphatic unsaturated dicarboxylic acid with aliphatic diol. In the present invention the preferable resin is the one produced by causing an unsaturated dicarboxylic acid like maleic acid, fumaric acid, etc. to undergo esterification reaction with diol like ethylene glycol, diethylene glycol, etc. This kind of thermosetting unsaturated polyester resin is commercially available by such trade names as "Rigolac" manufactured by Showa Kobunshi K.K., "Sumicon" manufactured by Sumitomo Bakelite Co., Ltd., etc. and is preferably used in the present invention.

(10) Phenolic Resin

In the present invention this kind of resin includes both novolak type and resol type. Above all, the novolak type obtained by curing with hexamethylene tetramine and the solid resol type having mainly the dimethylene ether bond are preferable. This kind of phenolic resin is commercially available by such trade names as "Sumicon PM" manufactured by Sumitomo Bakelite Co., Ltd., "Nikkalite" manufactured by The Nippon Synthetic Chemical Industry Co., Ltd., etc. and is preferably used in the present invention.

The foregoing explains the ten kinds of resin. Above all, polyacetal resin, ABS resin and polyamide resin, which are thermoplastics, are particularly preferably used as the resin (A).

Ethylene-α-olefin Copolymer

The ethylene-α-olefin random copolymer having polar groups (B) as used in the present invention is a polymer having a structure wherein polar groups are incorporated as chemical bonds into molecules of ethylene-α-olefin random copolymer. Hence, explanations are furnished as follows about the ethylene-α-olefin random copolymer which constitutes the matrix thereof.

Ethylene-α-olefin random copolymer is a copolymer produced by random copolymerizing ethylene, α-olefin and, if necessary, other monomer(s) in the presence of an olefin polymerization catalyst like Ziegler-Natta catalyst, a metallocene catalyst or the like. This manufacturing process is described in, for example, Japanese Patent Publication No. 1163/90.

There can be cited as examples of α-olefin copolymerizable with ethylene those α-olefins having 3 to 20 carbon atoms including propylene, 1-butene, 1-pentene, 4-methyl-1-pentene, 1-hexene, 1-heptene, 1-octene, 1-nonene, 1-decene, 1-undecene, 1-dodecene, 1-tridecene, 1-tetradecene, 1-hexadecene, 1-heptadecene, 1-octadecene, 1-nonadecene and 1-eicosene. In the polymerization step, one kind of α-olefin or two or more kinds combined may be used. Above all, it is most preferable from the viewpoints of productivity including the copolymerizability as well as physical properties of the copolymer to select propylene as the comonomer to use.

As to the ratios of the component monomer units existing in the copolymer, the ethylene unit comprises 20–80 mole %, or preferably 30–70 mole %, or more preferably 40–60 mole % of the total structural unit, and the α-olefin unit comprises 20–80 mole %, or preferably 30–70 mole %, or more preferably 40–60 mole %. The aggregate of the ethylene unit and the α-olefin unit is preferably 90–100 mole %, or particularly preferably 95–100 mole %. So long as random copolymer is of the above-mentioned composition, such copolymer imparts remarkable effects of improving sliding properties and friction/wear resistance of the resin (A).

In the course of the manufacture of ethylene α-olefin random copolymer, non-conjugated diene monomer such as dicyclopentadiene, ethylidene norbornene, 1,6-hexadiene may be caused to be copolymerized as the termonomer so as to be contained as a modicum structural unit in the copolymer to an extent not adversely affecting the object of the present invention. The amount to be contained is adjusted to not more than 10 mole %, or preferably not more than 5 mole % of the total structural unit.

In the case where said ethylene-α-olefin random copolymer is used for oxidation-modification which is mentioned hereunder, its number average molecular weight (Mn) falling within a range of 500–10000, or preferably 600–8000, or more preferably 700–5000, and [the ratio of the weight average molecular weight (Mw) to the number average molecular weight (Mn)] (Mw/Mn), which constitutes a handy measure of the width of its molecular weight distribution, adjusted to 1.2–3.0, or preferably 1.2–2.8 do facilitate preparation of the intended modified material and are, therefore, suitable. Additionally, when ethylene-α-olefin random copolymer is used for graft-modification, which is mentioned hereunder, it is desirable that its number average molecular weight (Mn) falls within a range of 500–9900, or preferably 600–8000, or more preferably 700–5000, and the ratio of the weight average molecular weight (Mw) to the number average molecular weight (Mn), (Mw/Mn), is adjusted to 1.1–2.8, or preferably 1.1–2.6, or more preferably 1.1–2.2. When ethylene-α-olefin random copolymer is within this range of number average molecular weight, it normally remains in the liquid state.

Values of the number average molecular weight (Mn) and the weight average molecular weight (Mw) are those which are determined by gel permeation chromatography (GPC) using a mono-disperse polystyrene as the standard and tetrahydrofuran (THF) as the solvent. Hence, Mn and Mw/Mn are values calculated on the basis of polystyrene.

Modified Copolymer (B)

The ethylene-α-olefin random copolymer having polar groups (B) according to the present invention has its number average molecular weight (Mn) and the molecular weight distribution falling in specific ranges, respectively.

That is to say, its number average molecular weight (Mn) is preferably within a range of 500–10000, or preferably 600–8000, or more preferably 700–5000. So long as the number average molecular weight (Mn) remains in said range, it is in a liquid state suitable for the admixing operation, sometimes exhibiting a highly viscous liquid state, and is capable of preventing evaporation during the admixing operation or due to heating during the molding operation.

On the other hand, [the ratio of the weight average molecular weight (Mw) to the number average molecular weight (Mn)] (Mw/Mn), which is a handy measure of the width of the molecular weight distribution, is in a range of 1.2–3, or preferably 1.2–2.8. This narrow molecular weight distribution and the number average molecular weight (Mn) in the range both combine to create favorable conditions for enabling the obtained resin composition to impart excellent properties including sliding properties, friction/wear resistance, and molding processibility.

The polar groups contained in this copolymer are oxygen atom-containing polar groups such as carboxyl group, carboxylic acid anhydride group, carbonyl group, oxycarbonyl group, formyl group, and hydroxyl group.

Ethylene-α-olefin random copolymer having polar groups (B) can be obtained as a terpolymer by causing a monomer having polar groups to coexist during the manufacture of ethylene-α-olefin random copolymer. However, a more desirable method of preparing a copolymer is to modify ethylene-α-olefin random copolymer by oxidation by a procedure described hereunder or to modify it by graft-copolymerization of an ethylenic unsaturated monomer having polar groups with ethylene-α-olefin random copolymer by a procedure described hereunder. The ethylene-α-olefin random copolymer having polar groups (B) which is obtained by either one of said modification methods is hereinafter referred to simply as "modified copolymer (B)."

Oxidation-modified Material (B-1)

What is desirable as an oxidation-modified material (B-1) produced from ethylene-α-olefin random copolymer suitable as a modified polymer is a modified material produced by subjecting said ethylene-α-olefin random copolymer to an oxidation reaction which satisfies the following conditions (a), (b), and (c).

(a) The oxygen content is 0.1–20% by weight, or preferably 0.5–15% by weight, or more preferably 1–10% by weight.

(b) The acid value (mgKOH/g) is 0.1–50, or preferably 0.2–45, or more preferably 0.5–40.

(c) The saponification value (mgKOH/g) is 0.1–100, or preferably 0.2–90, or more preferably 0.5–80.

The acid value and the saponification value can be determined in accordance with the procedures stipulated in JIS K2501-1980 and JIS K0070-1966, respectively.

So long as the modified copolymer (B-1) satisfies the above-mentioned conditions (a), (b), and (c), the affinity between the resin (A) and the modified copolymer (B-1) is enhanced to the extent that homogeneous mixing can be achieved and discoloration of the modified copolymer is controlled, thus substantially controlling discoloration of the finally produced molded article.

The oxidation-modified material produced from ethylene-α-olefin random copolymer (B-1) can be produced, for example, by subjecting the ethylene-α-olefin random copolymer manufactured by the polymerization process described in the Japanese Patent Publication No. 1163/90, to an oxidation reaction, for example, by way of selecting an oxidation condition from the oxidation method described in the Japanese Patent Publication No. 78096/95.

The oxidation-modified material produced from ethylene-α-olefin random copolymer (B-1) is given as an ethylene-α-olefin random copolymer which has ethylene and α-olefin units in its molecular terminals and main molecular chain oxidized randomly, and contains as oxygen-containing polar groups, for example, carboxylic group, oxycarbonyl group (ester bond), formyl group, carbonyl group and hydroxyl group.

It is desirable that the content of each group as contained in 1000 g of said modified copolymer (B-1) is within the following range.

(a) The carboxylic group content is normally 0.01–1 mole, or preferably 0.01–0.8 mole.

(b) The oxycarbonyl group (ester bond) content is normally 0.001–2 mole, or preferably 0.01–2 mole, or more preferably 0.01–1.5 mole.

(c) The aggregate of formyl group content and carbonyl group content (the total carbonyl group content) is 0.01–15 mole, or preferably 0.05–10 mole.

(d) The hydroxyl group content is 0.01–15 mole, or preferably 0.05–10 mole.

Graft-modified Material (B-2)

There can be cited as another suitable example of the modified copolymer (B) of the present invention a modified material (B-2) which is produced by graft-copolymerizing a monomer having polar groups with the same ethylene-α-olefin random copolymer as mentioned above as the matrix. There can be used as the graft monomer at least one kind of ethylenic unsaturated monomer having polar groups and 3–10 carbon atoms which is selected from the group consisting of carboxylic acid group, carboxylic acid anhydride group, ester group and hydroxyl group.

The ratio of graft monomer contained in the modified copolymer (B-2) is 0.1–20% by weight, or preferably 1–15% by weight, or more preferably 2–12% by weight. So long as the graft ratio remains in said range, the affinity between the resin (A) and the modified copolymer (B-2) is enhanced to the extent that the processibility of the molding composition is improved.

There can be cited as specific examples of ethylenic unsaturated monomer containing carboxylic acid group and ethylenic unsaturated monomer containing carboxylic acid anhydride group, respectively, unsaturated carboxylic acids including acrylic acid, methacrylic acid, fumaric acid, itaconic acid, citraconic acid, tetrahydrophthalic acid, and bicyclo[2,2,1]hept-2-ene-5,6-dicarboxylic acid; and unsaturated carboxylic anhydride including maleic anhydride, itaconic anhydride, citraconic anhydride, tetrahydrophthalic anhydride, and bicyclo[2,2,1]hept-2-ene-5,6-dicarboxylic anhydride. Among said compounds, maleic anhydride is the most preferable compound to use.

There can be cited as specific examples of ethylenic unsaturated monomer containing ester group, methyl acrylate, methyl methacrylate, methyl maleate, monomethyl maleate, diethyl fumarate, dimethyl itaconate, diethyl citraconate, dimethyl tetrahydrophthalic anhydride, dimethylbicyclo[2,2,1]hept-2-ene-5,6-dicarboxylate, and 2-hydroxyethyl (meth)acrylate. Among said compounds, 2-hydroxyethyl (meth)acrylate is the most preferable compound to use.

There can be cited as examples of ethylenic unsaturated monomer having hydroxyl group, (meth)acrylic ester having hydroxyl groups in its ester group portion, unsaturated alcohol, hydroxyl group-containing styrene derivatives, and hydroxyvinyl ether. Among said compounds, preferable ones are (meth)acrylic ester having hydroxyl group in its ester group portion and unsaturated alcohol.

There can be cited as examples of (meth)acrylic ester having hydroxyl group in its ester group portion mono (meth)acrylate compounds of polyhydric alcohols, or specifically 2-hydroxyethyl (meth)acrylate, 2-hydroxypropyl (meth)acrylate, 3-hydroxypropyl (meth)acrylate, 2-hydroxy-3-phenoxypropyl (meth)acrylate, glycerol mono (meth)acrylate, pentaerythritol mono(meth)acrylate, and poly(ethylene glycol)mono(meth)acrylate. Among said compounds, 2-hydroxyethyl (meth)acrylate is preferable.

There can be cited as specific examples of unsaturated alcohols, allyl alcohol, 2-methyl-3-buten-1-ol, 2-methyl-3-buten-2-ol, 3-methyl-3-buten-1-ol, 10-undecen-1-ol, 1-octen-3-ol, 2-methanol norbornene, and 2-butene-1,4-diol. Among said compounds, preferable ones are allyl alcohol, 2-methyl-3-buten-1-ol, and 2-methyl-3-buten-2-ol which by virtue of their moderate reactivity readily yield homogeneous graft copolymer.

There can be cited as specific examples of styrene derivatives containing hydroxyl group hydroxystyrene and the like.

There can be cited as specific examples of hydroxyvinyl ether hydroxymethyl vinyl ether, hydroxyethyl vinyl ether, hydroxypropyl vinyl ether, hydroxybutyl vinyl ether, hydroxymethyl propenyl ether, hydroxyethyl propenyl ether, hydroxypropyl propenyl ether, hydroxybutyl propenyl ether, hydroxymethyl, butenyl ether, hydroxyethyl butenyl ether, hydroxypropyl butenyl ether, and hydroxybutyl butenyl ether.

Besides the above-cited compounds, N-methylol acrylamide, 2-(meth)acryloyloxy ethyl acetyl phosphate, glycerol monoallyl ether and allyloxy ethanol may be used as hydroxyl group containing ethylenic unsaturated monomer.

The above-cited ethylenic unsaturated monomers may be used either individually or in a combination of two or more kinds.

In the manufacture of graft-modified material (B-2) from ethylene-α-olefin random copolymer, ethylene-α-olefin random copolymer is manufactured in the first place, for example, by the polymerization process described in the Japanese Patent Publication No. 1163/90. In case graft copolymerization is further carried out using an ethylenic unsaturated monomer having carboxylic group or derivative group thereof, the graft copolymerization may be carried out under conditions selected from the graft polymerization process described in the Japanese Patent Publication No. 34525/89. In case graft copolymerization is carried out using an ethylenic unsaturated monomer having hydroxylic group as the graft monomer, the graft copolymer may be manufactured in accordance with the graft polymerization process described in the Japanese Laid-open Patent Application No. 271355/93.

Molding Resin Composition

According to the present invention, the molding resin composition is prepared by adding 0.1–15 parts by weight, or preferably 0.2–10 parts by weight, or more preferably 0.5–8 parts by weight of ethylene-α-olefin random copolymer having polar groups (B) to 100 parts by weight of the resin (A). The composition falling in said composition ratio imparts excellent sliding properties, friction/wear resistance and molding processibility.

There may be added to said resin composition additives including antioxidant, thermal stabilizer, weathering stabilizer, flame retardant, antistatic agent, nucleating agent, colorant, foaming agent, filler and reinforcing agent to an extent not adversely affecting the object of the present invention.

There is no particular limitation with respect to the method of admixing ethylene-α-olefin random copolymer having polar groups (B) with the resin (A), but any well-known mixing method may be employed.

For instance, in case the resin (A) is a thermoplastic resin, the resin (A) and ethylene-α-olefin random copolymer having polar groups(B) may be evenly dispersed and admixed by kneading the two while the resin (A) is kept in the molten state. As the means of kneading, a single-screw extruder, a twin-screw extruder, a kneader, Plastomill, and the like may be utilized. Homogeneous mixing may be achieved by selecting appropriate kneading temperature, kneading time and other conditions in accordance with the kinds of resin (A) and ethylene-α-olefin random copolymer having polar groups (B) and, moreover, the mixing ratio, etc.

In case the resin (A) is a thermosetting resin, which in most cases is in the liquid state in the pre-cure stage, mixing with ethylene-α-olefin random copolymer having polar groups (B) is carried out readily and evenly using a mixer such as a Homomixer, a Henschel mixer, etc.

Molded articles of intended shapes can be manufactured employing various molding methods from resin compositions that are evenly admixed by said procedures. As for the molding method, any adequate method may be employed, in light of the prevailing difference between thermoplastic resin and thermosetting resin, from among the generally employed methods, including the extrusion method, the injection molding method, the vacuum forming method, the blow molding method, the compression molding method, the transfer molding method, the RIM molding method, and the casting method.

In case the resin (A) is a thermosetting resin, the molding resin composition of the present invention may contain a curing agent, or a curing agent may be added and admixed in the molding stage.

EXAMPLES

The present invention will be understood more readily with reference to the following examples and comparative examples; however, these examples are not to be construed to limit the scope of the present invention.

Examples of Preparation of Modified Copolymer

Methods of preparing the modified polymer used in Examples are described in detail as follows.

(1) Example No. 1 of Preparation of Oxidation-modified Material (B-1) Produced from Liquid Ethylene-propylene Random Copolymer 1.1 kg of liquid ethylene-propylene random copolymer (whose ethylene unit content was 49 mole % and propylene unit content was 51 mole %) was charged as the raw material into a separable flask equipped with a stirrer, a thermometer, an air feed tube for feeding air into the liquid phase and an air discharge port, and the fed material was heated to 170° C. with nitrogen being flowed into the gas phase. At a point when the temperature came to settle at a constant level, dry air was bubbled through the air feed tube into the liquid phase at a flow rate of 5.5 liters/min, and the reaction was continued for 15 hrs. with agitation performed by the stirrer. Thereupon air feeding was discontinued and the flask with its content was cooled to room temperature. The product thus obtained was a yellow liquid as an oxidation-modified material from ethylene-propylene random copolymer.

Properties of the raw material ethylene-propylene random copolymer and the oxidation-modified material thereby produced are shown in Table 1.

TABLE 1

|  | Raw material | Modified copolymer |
| --- | --- | --- |
| Number average molecular weight (Mn) | 3010 | 1790 |
| Mw/Mn | 1.6 | 2.3 |
| Acid value (mgKOH/g) |  | 15.2 |
| Saponification value (mgKOH/g) |  | 41.9 |
| Oxygen content (% by weight) |  | 6.2 |
| Carboxylic group content (*) |  | 0.27 |
| Oxycarbonyl group content (*) |  | 0.38 |
| Hydroxyl group content (*) |  | 0.375 |

*mol/1 kg of modified copolymer (2) Example No. 2 of Preparation of Oxidation-modified Material (B-1) Produced from Liquid Ethylene-propylene Random Copolymer An oxidation-modified material was prepared from ethylene-propylene random copolymer as a dark yellow liquid by the same procedure as in the above-mentioned Example No. 1 of Preparation of Oxidation-modified Material (B-1) except that the reaction temperature was 130° C. and the reaction time was 90 hrs. Properties of the raw material and the product are shown in Table 2.

TABLE 2

|  | Raw material | Modified copolymer |
| --- | --- | --- |
| Number average molecular weight (Mn) | 3010 | 1060 |
| Mw/Mn | 1.6 | 2.3 |
| Acid value (mgKOH/g) |  | 36 |
| Saponification value (mgKOH/g) |  | 57 |
| Oxygen content (% by weight) |  | 13 |
| Carboxylic group content (*) |  | 0.64 |
| Oxycarbonyl group content (*) |  | 0.38 |
| Hydroxyl group content (*) |  | 0.72 |

*mol/1 kg of modified copolymer (3) Example No. 3 of Preparation of Oxidation-modified Material (B-1) Produced from Liquid Ethylene-propylene Random Copolymer An oxidation-modified material was prepared from ethylene-propylene random copolymer as a yellow liquid by the same procedure as in the above-mentioned Example No. 1 of Preparation of Oxidation-modified Material (B-1) except that ethylene-propylene random copolymer (whose ethylene unit content was 53 mole % and propylene unit content was 47 mole %) was used and the reaction time was 25 hrs. Properties of the raw material and the product are shown in Table 3.

TABLE 3

|  | Raw material | Modified copolymer |
| --- | --- | --- |
| Number average molecular weight (Mn) | 7730 | 1990 |
| Mw/Mn | 1.9 | 2.7 |
| Acid value (mgKOH/g) |  | 24 |
| Saponification value (mgKOH/g) |  | 52 |
| Oxygen content (% by weight) |  | 7.4 |
| Carboxylic group content (*) |  | 0.43 |
| Oxycarbonyl group content (*) |  | 0.50 |
| Hydroxyl group content (*) |  | 0.35 |

*mol/1 kg modified polymer (4) Example No. 1 of Preparation of Graft-modified Material (B-2) Produced from Liquid Ethylene-propylene Random Copolymer 1.0 kg of ethylene-propylene random copolymer (whose ethylene unit content was 48 mole % and propylene unit content was 52 mole %) was charged as the raw material into a 2-liter glass reactor equipped with an agitator onto which a nitrogen feed tube, a water-cooled condenser, a thermometer and 2 dropping funnels were mounted, and dissolved oxygen was purged by displacement with nitrogen which was supplied for 2 hrs. Thereupon, the internal temperature of the reactor was elevated to 160° C. and 150 g of maleic anhydride preheated to 60° C. and rendered into the liquid state and 30 g of di-tert-butyl peroxide were charged into the two dropping funnels and then allowed to drip over a period of 10 hrs. The reaction was further continued for 2 additional hrs. beyond the point when the drip was completed. Thereupon, the internal temperature of the reactor was elevated to 180° C. and a brown highly viscous liquid was obtained by removing unreacted maleic anhydride and decomposed matters produced from di-tert-butyl peroxide under a reduced pressure (20 Torr).

Properties of the raw material and the modified copolymer thereby prepared are shown in Table 4. The graft ratio as indicated in the Table stands for a succinic anhydride skeleton component that was calculated on the basis of an oxygen content determined by the elemental analysis of the modified copolymer.

TABLE 4

|  | Raw material | Modified copolymer |
| --- | --- | --- |
| Number average molecular weight (Mn) | 3300 | 3750 |
| Mw/Mn | 1.6 | 2.2 |
| Graft ratio (% by weight) |  | 9.8 |

(5) Example No. 2 of Preparation of Graft-modified Material (B-2) Produced from Liquid Ethylene-propylene Random Copolymer A graft-modified material was prepared from liquid ethylene-propylene random copolymer as the raw material by the same procedure as in Example No.1 of Preparation of Graft-modified Material (B-2) except that 1.0 kg of ethylene-propylene copolymer (whose ethylene unit content was 52 mole % and propylene unit content was 48 mole %), 25 g of maleic anhydride and 5 g of di-tert-butyl peroxide were used and the dripping time was 2 hrs. Properties of the raw material and the product are shown in Table 5.

TABLE 5

|  | Raw material | Modified copolymer |
| --- | --- | --- |
| Number average molecular weight (Mn) | 5220 | 5440 |
| Mw/Mn | 1.7 | 1.9 |
| Graft ratio (% by weight) |  | 2.2 |

(6) Example No. 3 of Preparation of Graft-modified Material (B-2) Produced from Liquid Ethylene-propylene Random Copolymer A graft-modified material was prepared from liquid ethylene-propylene random copolymer as the raw material by the same procedure as in Example No. 1 of Preparation of Graft-modified Material (B-2) except that 1.0 kg of ethylene-propylene copolymer (whose ethylene unit content was 52 mole % and propylene unit content was 48 mole %), 69 g of maleic anhydride and 14 g of di-tert-butyl peroxide were used and the dripping time was 5 hrs. Properties of the raw material and the product are shown in Table 6.

TABLE 6

|  | Raw material | Modified copolymer |
| --- | --- | --- |
| Number average molecular weight (Mn) | 5220 | 5620 |
| Mw/Mn | 1.7 | 2.2 |
| Graft ratio (% by weight) |  | 5.2 |

(7) Example No. 4 of Preparation of Graft-modified Material (B-2) Produced from Liquid Ethylene-propylene Random Copolymer A graft-modified material was prepared from liquid ethylene-propylene random copolymer as the raw material by the same procedure as in Example No. 1 of Preparation of Graft-modified Material (B-2) except that 1.0 kg of ethylene-propylene copolymer (whose ethylene unit content was 56 mole % and propylene unit content was 44 mole %), 36 g of maleic anhydride and 7.2 g of di-tert-butyl peroxide were used and the dripping time was 5 hrs. Properties of the raw material and the product are shown in Table 7.

TABLE 7

|  | Raw material | Modified copolymer |
| --- | --- | --- |
| Number average molecular weight (Mn) | 7700 | 7910 |
| Mw/Mn | 1.8 | 2.0 |
| Graft ratio (% by weight) |  | 3.1 |

(8) Example No. 5 of Preparation of Graft-modified Material (B-2) Produced from Liquid Ethylene-propylene Random Copolymer A graft-modified material was prepared from liquid ethylene-propylene random copolymer as the raw material by the same procedure as in Example No. 1 of Preparation of Graft-modified Material (B-2) except that 908 g of ethylene-propylene copolymer (whose ethylene unit content was 52 mole % and propylene unit content was 48 mole %), 69 g of 2-hydroxyethyl methacrylate and 14 g of di-tert-butyl peroxide were used and the dripping time was 5 hrs. The mixture of reactants was subjected to a clay filtration step for removal of 2-hydroxyethyl methacrylate polymer mingling therein. Thus was obtained a milky white highly viscous liquid. Properties of the raw material and the product are shown in Table 8.

TABLE 8

|  | Raw material | Modified copolymer |
| --- | --- | --- |
| Number average molecular weight (Mn) | 5220 | 5630 |
| Mw/Mn | 1.7 | 2.1 |
| Graft ratio (% by weight) |  | 5.6 |

(9) Example No. 6 of Preparation of Graft-modified Material (B-2) Produced from Liquid Ethylene-propylene Random Copolymer 200 g of ethylene-propylene random copolymer (whose ethylene unit content was 48 mole % and propylene unit content was 52 mole %) was charged into a 500-ml glass reactor equipped with an agitator onto which a nitrogen feed tube, a water-cooled condenser, a thermometer and 2 dropping funnels were mounted, and dissolved oxygen was purged by displacement with nitrogen which was supplied for 2 hrs. Thereupon, the internal temperature of the reactor was elevated to 160° C. and 20 g of allyl alcohol and 4 g of di-tert-butyl peroxide which had been charged into the two dropping funnels, respectively, were allowed to drip over a period of 3 hrs. The reaction was further continued for 1 additional hr. beyond the point when the drip was completed. Thereupon, the internal temperature of the reactor was elevated to 180° C. and a white opaque viscous liquid was obtained by removing unreacted allyl alcohol and decomposed matters from di-tert-butyl peroxide under a reduced pressure (10 Torr).

Properties of the raw material and the modified copolymer thereby produced are shown in Table 9. The graft ratio as indicated in the Table stands for a hydroxyl group containing graft monomer component which was calculated on the basis of a hydroxyl group content of the specimen determined by measurement of the hydroxyl group value by the acetylation method. The hydroxyl group value was determined on the basis of the difference between (i) a value obtained by titrating a 1N-sodium hydroxide solution using phenolphthalein as the indicator into a liquid prepared by first acetylating the specimen with an excess acetic anhydride/pyridine solution with heating and then adding distilled water thereto to convert acetic anhydride into acetic acid and (ii) a value obtained by the same procedure from a system prepared without the specimen.

TABLE 9

|  | Raw material | Modified copolymer |
|---|---|---|
| Number average molecular weight (Mn) | 3300 | 3450 |
| Mw/Mn | 1.7 | 2.1 |
| Graft ratio (% by weight) |  | 6.7 |

(10) Example No. 7 of Preparation of Graft-modified Material (B-2) Produced from Liquid Ethylene-propylene Random Copolymer A white liquid product was prepared by carrying out a reaction by the same procedure as in Example No. 6 of Preparation of Graft-modified Material (B-2) except that 360 g of ethylene-propylene copolymer (whose ethylene unit content was 48 mole % and propylene unit content was 52 mole %) as the raw material, 40 g of 2-hydroxyethyl methacrylate and 8 g of di-tert-butyl peroxide were used. Properties of the raw material and the product are shown in Table 10.

TABLE 10

|  | Raw material | Modified copolymer |
|---|---|---|
| Number average molecular weight (Mn) | 3300 | 3310 |
| Mw/Mn | 1.7 | 2.4 |
| Graft ratio (% by weight) |  | 9.1 |

(11) Example No. 8 of Preparation of Graft-modified Material (B-2) Produced from Liquid Ethylene-propylene Random Copolymer A colorless transparent liquid product was prepared by carrying out a reaction by the same procedure as in Example No. 6 of Preparation of Graft-modified Material (B-2) except that 250 g of ethylene-propylene copolymer (whose ethylene unit content was 48 mole % and propylene unit content was 52 mole %) as the raw material, 18 g of 2-methyl-3-buten-2-ol and 4 g of di-tert-butyl peroxide were used. Properties of the raw material and the product are shown in Table 11.

TABLE 11

|  | Raw material | Modified copolymer |
|---|---|---|
| Number average molecular weight (Mn) | 3300 | 3380 |
| Mw/Mn | 1.7 | 2.0 |
| Graft ratio (% by weight) |  | 5.1 |

(12) Example No. 9 of Preparation of Graft-modified Material (B-2) Produced from Liquid Ethylene-propylene Random Copolymer A colorless transparent liquid product was prepared by carrying out a reaction by the same procedure as in Example No. 8 of Preparation of Graft-modified Material (B-2) except that 250 g of ethylene-propylene copolymer (whose ethylene unit content was 52 mole % and propylene unit content was 48 mole %) was used as the raw material. Properties of the raw material and the product are shown in Table 12.

TABLE 12

|  | Raw material | Modified copolymer |
|---|---|---|
| Number average molecular weight (Mn) | 5220 | 5310 |
| Mw/Mn | 1.7 | 1.9 |
| Graft ratio (% by weight) |  | 4.8 |

(13) Example No. 10 of Preparation of Graft-modified Material (B-2) Produced from Liquid Ethylene-propylene Random Copolymer A liquid product of reaction was obtained by carrying out a reaction by the same procedure as in Example No. 8 of Preparation of Graft-modified Material (B-2) except that 250 g of ethylene-propylene copolymer (whose ethylene unit content was 56 mole % and propylene unit content was 44 mole %) was used as the raw material. Properties of the raw material and the product are shown in Table 13.

TABLE 13

|  | Raw material | Modified copolymer |
|---|---|---|
| Number average molecular weight (Mn) | 7700 | 7860 |
| Mw/Mn | 1.8 | 2.2 |
| Graft ratio (% by weight) |  | 4.5 |

Properties Evaluation Methods

There were performed measurement and evaluation of (1) friction/wear properties, (2) processibility and compatibility (3) mold release properties (4) mold fouling properties, and (5) mold shrinkage of the molded articles obtained in Examples and Comparative Examples in conformance with the following methods.

(1) Friction/Wear Properties (slip properties)

The friction/wear properties on the contacting surfaces of two identical materials (resin/resin) were evaluated in accordance with the following method.

Static and kinetic coefficients of friction were determined, respectively, in accordance with the method (C) stipulated in ASTM D-1894-75 using an Instron-type multipurpose materials testing apparatus onto which a slip properties measuring jig was mounted.

Moreover, wear tests were performed under the following conditions, and rates of wear were measured after the tests.

Contacting surfaces: 2 cm²

Load: 1 kg (plane pressure: 0.5 kgf/cm²)

Sliding speed: 33 times/min.

Stroke: 85 mm

Sliding time: 6 hrs.

(2) Processability and Compatibility

Symbols "○, Δ, and X" were used to indicate various results of evaluation made on the respective samples as follows.

Symbol "○": The modified copolymer was readily assimilated into the matrix resin via the stage of being kneaded in an extruder, demonstrated good extrudability, and the surface of the resin after kneading was hardly sticky or tacky.

Symbol "Δ": The extrudability was limited to some extent, and the surface of the resin after kneading was sticky or tacky.

Symbol "x": The modified copolymer was assimilated into the matrix resin with great difficulty, the extrudability was poor, and the surface of the resin after kneading was remarkably sticky or tacky.

(3) Mold Release Properties

Symbols "○, Δ, and X" were used to indicate various results of evaluations made on the respective samples as follows.

Symbol "○": The sheet formed by a sheet forming machine was free of any deformation, and the molded article was smoothly released from the mold.

Symbol "Δ": The sheet formed by a sheet forming machine suffered partial deformations.

Symbol "x": The sheet formed by a sheet forming machine showed a severe overall deformation.

(4) Mold Fouling Properties

Symbols "○, Δ, and X" were used to indicate various results of evaluations made on the respective samples as follows.

Symbol "○": The molded articles produced by said forming machine were molded free of any stain.

Symbol "Δ": The molded articles produced by said forming machine were partially stained.

Symbol "x": The molded articles produced by said forming machine were badly stained throughout their surfaces.

(5) Mold Shrinkage of Molded Article

Shrinkage of molded articles was measured in accordance with the procedures stipulated in ASTM D-955.

EXAMPLE 1

100 parts by weight of polyacetal resin (manufactured by Polyplastics Co, Ltd.; tradename: Duracon M90) and 2 parts by weight of oxidation-modified material produced from liquid ethylene-propylene random copolymer obtained as per Example No. 1 of Preparation of Oxidation-modified Material (B-1) were melted and admixed in a twin-screw extruder having a cylinder diameter of 30 mm (manufactured by Japan Steel Works, Ltd. The resin mixture thus obtained was compression molded into a 220 mm×200 mm×3 mm sheet at 250° C. using a sheet forming machine (manufactured by Kawasaki Yuko Co., Ltd.). The obtained compression-molded sheet was evaluated as for its coefficients of friction and wear rate, processibility, compatibility, mold releasability, mold fouling and mold shrinkage. Results of the evaluation are shown in Table 14.

EXAMPLE 2

A sheet was formed by the same procedure as in Example 1 except that an oxidation-modified material produced from liquid ethylene-propylene random copolymer obtained in Example No. 2 of Preparation of Oxidation-modified Material (B-1) was used. Results of evaluation of physical properties of the obtained sheet are shown in Table 14.

EXAMPLE 3

A sheet was formed by the same procedure as in Example 1 except that an oxidation-modified material produced from liquid ethylene-propylene random copolymer obtained in Example No. 3 of Preparation of Oxidation-modified Material (B-1) was used. Results of evaluation of physical properties of the obtained sheet are shown in Table 14.

COMPARATIVE EXAMPLE 1

A sheet was formed by the same procedure as in Example 1 except that the oxidation-modified material was not used. Results of evaluation of physical properties of the obtained sheet are shown in Table 14.

COMPARATIVE EXAMPLE 2

A sheet was formed by the same procedure as in Example 1 except that an unmodified liquid ethylene-propylene random copolymer (whose ethylene unit content was 52 mole %, number average molecular weight (Mn) was 5220, and Mw/Mn was 1.7) was used. Results of evaluation of physical properties of the obtained sheet are shown in Table 14.

EXAMPLES 4–6

Sheets were formed by the same procedure as in Examples 1–3, respectively, except that ABS resin (manufactured by Ube-Cycon Co., Ltd.; tradename: HM-11001) was used in place of polyacetal resin. Results of evaluation of physical properties of the obtained sheet are shown in Table 14.

COMPARATIVE EXAMPLE 3

A sheet was formed by the same procedure as in Example 4 except that the oxidation-modified material produced from liquid ethylene-propylene random copolymer was not used. Results of evaluation of physical properties of the obtained sheet are shown in Table 14.

COMPARATIVE EXAMPLE 4

A sheet was formed by the same procedure as in Example 4 except that an unmodified liquid ethylene-propylene random copolymer (whose ethylene unit content was 52 mole %, number average molecular weight (Mn) was 5220, and Mw/Mn was 1.7) was used. Results of evaluation of physical properties of the obtained sheet are shown in Table 14.

EXAMPLES 7–9

Sheets were formed by the same procedure as in Examples 1–3, respectively, except that polyamide resin (manufactured by Ube Industries, Ltd.; tradename: Ube Nylon 1013B) was used in place of polyacetal resin. Results of evaluation of physical properties of the obtained sheet are shown in Table 14.

COMPARATIVE EXAMPLE 5

A sheet was formed by the same procedure as in Example 7 except that the oxidation-modified material produced from liquid ethylene-propylene random copolymer was not used. Results of evaluation of physical properties of the obtained sheet are shown in Table 14.

EXAMPLE 10

100 parts by weight of polyacetal resin (manufactured by Polyplastics Co, Ltd.: tradename: Duracon M90) and 2 parts by weight of the graft-modified material produced from liquid ethylene-propylene random copolymer obtained as per Example No. 1 of Preparation of Graft-modified Material (B-2) were melted and admixed in a twin-screw extruder having a cylinder diameter of 30 mm (manufactured by Japan Steel Works, Ltd). The resin mixture thus obtained was compression molded into a 200 mm×200 mm×3 mm sheet at 250° C. using a sheet forming machine (manufactured by Kawasaki Yuko Co., Ltd.). Results of the evaluation of physical properties of the obtained sheet are shown in Table 15.

EXAMPLE 11

A sheet was formed by the same procedure as in Example 10 except that the graft-modified material produced from liquid ethylene-propylene random copolymer as obtained in Example No. 2 of Preparation of Graft-modified Material (B-2) was used. Results of evaluation of physical properties of the obtained sheet are shown in Table 15.

EXAMPLE 12

A sheet was formed by the same procedure as in Example 10 except that the graft-modified material produced from liquid ethylene-propylene random copolymer as obtained in Example No. 3 of Preparation of Graft-modified Material (B-2) was used. Results of evaluation of physical properties of the obtained sheet are shown in Table 15.

EXAMPLE 13

A sheet was formed by the same procedure as in Example 10 except that the graft-modified material produced from liquid ethylene-propylene random copolymer as obtained in Example No. 4 of Preparation of Graft-modified Material (B-2) was used. Results of evaluation of physical properties of the obtained sheet are shown in Table 15.

EXAMPLE 14

A sheet was formed by the same procedure as in Example 10 except that the graft-modified material produced from liquid ethylene-propylene random copolymer as obtained in Example No. 5 of Preparation of Graft-modified Material (B-2) was used. Results of evaluation of physical properties of the obtained sheet are shown in Table 15.

EXAMPLES 15–19

Sheets were formed by the same procedure as in Examples 10–14, respectively, except that ABS resin (manufactured by Ube-Cycon Co., Ltd.; tradename: HM-11001) was used in place of polyacetal resin. Results of evaluation of physical properties of the obtained sheet are shown in Table 15.

EXAMPLE 20

100 parts by weight of polyacetal resin (manufactured by Polyplastics Co, Ltd.; tradename: Duracon M90) and 2 parts by weight of graft-modified material produced from liquid ethylene-propylene random copolymer which was obtained as per Example No. 6 of Preparation of Graft-modified Material (B-2) were melted and admixed in a twin-screw extruder having a cylinder diameter of 30 mm (manufactured by Japan Steel Works, Ltd.) The resin mixture thus obtained was compression molded into a 200 mm×200 mm×3 mm sheet at 250° C. using a sheet forming machine (manufactured by Kawasaki Yuko Co., Ltd.). Results of evaluation of physical properties of the obtained sheet are shown in Table 15.

EXAMPLE 21

A sheet was formed by the same procedure as in Example 20 except that the liquid ethylene-propylene random copolymer obtained in Example No. 7 of Preparation of Graft-modified Material (B-2) was used. Results of evaluation of physical properties of the obtained sheet are shown in Table 15.

EXAMPLE 22

A sheet was formed by the same procedure as in Example 20 except that the graft-modified material produced from liquid ethylene-propylene random copolymer as obtained in Example No. 8 of Preparation of Graft-modified Material (B-2) was used. Results of evaluation of physical properties of the obtained sheet are shown in Table 15.

EXAMPLE 23

A sheet was formed by the same procedure as in Example 20 except that the graft-modified material produced from liquid ethylene-propylene random copolymer as obtained in Example No. 9 of Preparation of Graft-modified Material (B-2) was used. Results of evaluation of physical properties of the obtained sheet are shown in Table 15.

EXAMPLE 24

A sheet was formed by the same procedure as in Example 20 except that the graft-modified material produced from liquid ethylene-propylene random copolymer as obtained in Example No. 10 of Preparation of Graft-modified Material (B-2) was used. Results of evaluation of physical properties of the obtained sheet are shown in Table 15.

EXAMPLES 25–29

Sheets were formed by the same procedure as in Examples 20–24, respectively, except that ABS resin (manufactured by Toray Corporation; tradename: Toyorac 500) was used in place of polyacetal resin. Results of evaluation of physical properties of the obtained sheet are shown in Table 15.

COMPARATIVE EXAMPLE 6

A sheet was formed by the same procedure as in Example 25 except that the liquid ethylene-propylene random copolymer as used in Example 25 was not used. Results of evaluation of physical properties of the obtained sheet are shown in Table 15.

COMPARATIVE EXAMPLE 7

A sheet was formed by the same procedure as in Example 25 except that an unmodified liquid ethylene-propylene random copolymer (whose ethylene unit content was 52 mole %, propylene unit content was 48 mole %, number average molecular weight (Mn) was 5220, and Mw/Mn was 1.7) was used. Results of evaluation of physical properties of the obtained sheet are shown in Table 15.

[INDUSTRIAL APPLICABILITY]

The molding resin composition of the present invention renders it possible to produce molded articles having excellent sliding properties and friction/wear resistance since it contains the resin (A) and ethylene-α-olefin random copolymer having polar groups (B).

And, the molding resin composition of the present invention excels in the flow properties, imparts good mold release properties, and is free of mold fouling, and hence has good molding processibility.

Consequently, the molding resin composition of the present invention is suitably used in those fields of industries wherein good sliding properties and friction/wear resistance are requisite, for example, for such uses as gears, rotary shafts and bearings.

TABLE 14

| | | Kind of Resin (A) | Kind of Modified Copolymer | | Static Coefficient of Friction | Kinetic Coefficient of Friction | Wear Rate (wt. %) | Processibility (Compatibility) | Mold Release Properties | Mold Fouling Properties | Mold Shrinkage |
|---|---|---|---|---|---|---|---|---|---|---|---|
| Example | 1 | Polyacetal | Oxidation-modified Material | (1) | 0.26 | 0.21 | 0.13 | ○ | ○ | ○ | 0.2 |
| | 2 | | | (2) | 0.25 | 0.20 | 0.13 | ○ | ○ | ○ | 0.3 |
| | 3 | | | (3) | 0.25 | 0.20 | 0.10 | ○ | ○ | ○ | 0.2 |
| Comparative Example | 1 | Polyacetal | — | | 0.33 | 0.29 | 0.35 | ○ | Δ | ○ | 0.4 |
| | 2 | | Unmodified Material | | 0.27 | 0.28 | 0.38 | X | Δ | ○ | 0.3 |
| Example | 4 | ABS | Oxidation-modified Material | (1) | 0.39 | 0.37 | 0.05 | ○ | ○ | ○ | 0.4 |
| | 5 | | | (2) | 0.34 | 0.30 | 0.03 | ○ | ○ | ○ | 0.4 |
| | 6 | | | (3) | 0.36 | 0.33 | 0.03 | ○ | ○ | ○ | 0.3 |
| Comparative Example | 3 | ABS | — | | 0.51 | 0.45 | 0.07 | ○ | Δ | ○ | 0.5 |
| | 4 | | Unmodified Material | | 0.52 | 0.47 | 0.11 | X | Δ | ○ | 0.5 |
| Example | 7 | Polyamide | Oxidation-modified Material | (1) | 0.68 | 0.38 | 0.05 | Δ~○ | ○ | ○ | 0.3 |
| | 8 | | | (2) | 0.63 | 0.36 | 0.04 | ○ | ○ | ○ | 0.2 |
| | 9 | | | (3) | 0.66 | 0.38 | 0.03 | Δ~○ | ○ | ○ | 0.3 |
| Comparative Example 5 | | Polyamide | — | | 0.68 | 0.41 | 0.08 | ○ | Δ | ○ | 0.2 |

LEGEND: "○": Good    "Δ": Fair    "X": Poor

TABLE 15

| | | Kind of Resin (A) | Kind of Modified Copolymer | | Static Coefficient of Friction | Kinetic Coefficient of Friction | Wear Rate (wt. %) | Processability (Compatibility) | Mold Release Properties | Mold Fouling Properties | Mold Shrinkage |
|---|---|---|---|---|---|---|---|---|---|---|---|
| Example | | | Graft-modified | | | | | | | | |
| | 10 | Polyacetal | Material | (1) | 0.26 | 0.24 | 0.15 | ○ | ○ | ○ | 0.2 |
| | 11 | | | (2) | 0.28 | 0.28 | 0.13 | Δ~○ | ○ | ○ | 0.3 |
| | 12 | | | (3) | 0.24 | 0.23 | 0.11 | ○ | ○ | ○ | 0.2 |
| | 13 | | | (4) | 0.27 | 0.28 | 0.17 | ○ | ○ | ○ | 0.3 |
| | 14 | | | (5) | 0.26 | 0.26 | 0.14 | ○ | ○ | ○ | 0.2 |
| Example | | | Graft-modified | | | | | | | | |
| | 15 | ABS | Material | (1) | 0.40 | 0.37 | 0.01 | ○ | ○ | ○ | 0.3 |
| | 16 | | | (2) | 0.48 | 0.40 | 0.05 | Δ~○ | ○ | ○ | 0.5 |
| | 17 | | | (3) | 0.40 | 0.36 | 0.01 | ○ | ○ | ○ | 0.3 |
| | 18 | | | (4) | 0.45 | 0.40 | 0.04 | ○ | ○ | ○ | 0.4 |
| | 19 | | | (5) | 0.48 | 0.40 | 0.05 | Δ~○ | ○ | ○ | 0.4 |
| Example | | | Graft-modified | | | | | | | | |
| | 20 | Polyacetal | Material | (6) | 0.14 | 0.14 | | ○ | ○ | ○ | 0.3 |
| | 21 | | | (7) | 0.14 | 0.23 | | ○ | ○ | ○ | 0.3 |
| | 22 | | | (8) | 0.13 | 0.18 | | ○ | ○ | ○ | 0.2 |
| | 23 | | | (9) | 0.14 | 0.21 | | ○ | ○ | ○ | 0.3 |
| | 24 | | | (10) | 0.16 | 0.24 | | Δ~○ | ○ | ○ | 0.3 |
| Example | | | Graft-modified | | | | | | | | |
| | 25 | ABS | Material | (6) | 0.12 | 0.11 | | ○ | ○ | ○ | 0.6 |
| | 26 | | | (7) | 0.13 | 0.11 | | ○ | ○ | ○ | 0.6 |
| | 27 | | | (8) | 0.12 | 0.10 | | ○ | ○ | ○ | 0.6 |
| | 28 | | | (9) | 0.15 | 0.13 | | ○ | ○ | ○ | 0.7 |
| | 29 | | | (10) | 0.17 | 0.14 | | Δ~○ | ○ | ○ | 0.7 |
| Comparative | | | | | | | | | | | |
| Example | 6 | ABS | Unmodified | | 0.32 | 0.28 | | — | ○ | ○ | 0.6 |
| | 7 | | material | | 0.13 | 0.11 | | Δ | Δ | Δ | 0.8 |

LEGEND: "○": Good    "Δ": Fair    "X": Poor

What is claimed is:

1. A molding resin composition comprising:
   (A) 100 parts by weight of one kind of resin selected from the group consisting of polyacetal resin, ABS resin, polyamide resin, polyphenylene oxide resin, polyimide resin, thermoplastic polyester resin, polycarbonate resin, epoxy resin, thermosetting unsaturated polyester resin and phenolic resin, and
   (B) 0.1–15 parts by weight of, at room temperature, a liquid ethylene-α-olefin random copolymer having polar groups,
   wherein (a) said ethylene-α-olefin random copolymer comprises 30–70 mole % of ethylene unit and 30–70 mole % of α-olefin units based on its total structural units, and
   wherein said ethylene-α-olefin random copolymer having polar groups has (b) its number average molecular weight (Mn) is 500–10000, and
   (c) its molecular weight distribution (Mw/Mn) represented by the ratio of the weight average molecular weight (Mw) to the number average molecular weight (Mn) is 1.2–3.

2. The molding resin composition according to claim 1, wherein the polar group of said ethylene-α-olefin random copolymer having polar groups is one kind selected from the group consisting of carboxyl group, carboxylic acid anhydride group, carbonyl group, oxycarbonyl group, formyl group and hydroxyl group.

3. The molding resin composition according to claim 1, wherein said ethylene-α-olefin random copolymer having polar groups is an oxidation-modified material (B-1) obtained from ethylene-α-olefin random copolymer.

4. The molding resin composition according to claim 3, wherein said oxidation-modified material (B-1) has an oxygen content of 0.1–20% by weight, an acid value of 0.1–50 mgKOH/g, and a saponification value of 0.1–100 mgKOH/g.

5. The molding resin composition according to claim 3, wherein said oxidation-modified material (B-1) produced from said ethylene-α-olefin random copolymer is comprised by 0.1–10 parts by weight per 100 part by weight of the resin (A).

6. The molding resin composition according to claim 1, wherein said ethylene-α-olefin random copolymer having polar groups is a graft-modified material (B-2) produced by graft-copolymerizing 0.1–20% by weight of an ethylenic unsaturated monomer having 3–10 carbon atoms which has at least one kind of polar group selected from the group consisting of carboxylic acid group, carboxylic acid anhydride group, ester group and hydroxyl group with ethylene-α-olefin random copolymer.

7. The molding resin composition according to claim 6, wherein said graft-modified material (B-2) of ethylene-α-olefin random copolymer is comprised by 0.1–10 parts by weight per 100 parts by weight of the resin (A).

8. The molding resin composition according to claim 6, wherein the graft monomer in said graft-modified material (B-2) of ethylene-α-olefin random copolymer is a maleic anhydride.

9. The molding resin composition according to claim 6, wherein the graft monomer in said graft-modified material (B-2) produced from ethylene-α-olefin random copolymer is a (meth)acrylic ester.

10. The molding resin composition according to claim 6, wherein the graft monomer in said graft-modified material (B-2) produced from ethylene-α-olefin random copolymer is a (meth)acrylic ester having a hydroxyl group in its ester group portion.

11. The molding resin composition according to claim 6, wherein the graft monomer in said graft-modified material (B-2) produced from ethylene-α-olefin random copolymer is a 2-hydroxyethyl (meth)acrylate.

12. The molding resin composition according to claim 6, wherein the graft monomer in said graft-modified material (B-2) produced from ethylene-α-olefin random copolymer is an unsaturated alcohol.

13. The molding resin composition according to claim 6, wherein the graft monomer in said graft-modified material (B-2) produced from ethylene-α-olefin random copolymer is one kind selected from the group consisting of allyl alcohol, 2-methyl-3-buten-1-ol, and 2-methyl-3-buten-2-ol.

14. The molding resin composition according to claim 1, wherein said ethylene-α-olefin random copolymer is an ethylene-propylene random copolymer.

15. The molding resin composition according to claim 1, wherein said resin (A) is a polyacetal resin.

16. The molding resin composition according to claim 1, wherein said resin (A) is an ABS resin.

17. The molding resin composition according to claim 1, wherein said resin (A) is a polyamide resin.

* * * * *